(12) United States Patent
Nolan et al.

(10) Patent No.: US 12,422,283 B2
(45) Date of Patent: Sep. 23, 2025

(54) SENSOR DATA INTEGRATION AND EVENT DETECTION (71) Applicant: EATON INTELLIGENT POWER LIMITED, Dublin (IE)

(72) Inventors: Keith Nolan, Mullingar (IE); Maebh Larkin, Ballinteer (IE); Johannes Van De Belt, Dublin (IE); Ruth Quinn, Wexford (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 407 days.

(21) Appl. No.: 17/906,567

(22) PCT Filed: Mar. 17, 2020

(86) PCT No.: PCT/EP2020/057269
§ 371 (c)(1),
(2) Date: Sep. 16, 2022

(87) PCT Pub. No.: WO2021/185432
PCT Pub. Date: Sep. 23, 2021

(65) Prior Publication Data
US 2023/0132845 A1 May 4, 2023

(51) Int. Cl.
G01D 9/00 (2006.01)
G01D 7/02 (2006.01)
(52) U.S. Cl.
CPC ............ G01D 9/005 (2013.01); G01D 7/02 (2013.01)

(58) Field of Classification Search
CPC ............ G01D 9/005; G01D 7/02; G01D 21/00
See application file for complete search history.

(56) References Cited

U.S. PATENT DOCUMENTS

| 2017/0344404 | A1* | 11/2017 | Liongosari | ............... G06F 9/542 |
| 2020/0050206 | A1* | 2/2020 | Deyle | .................... G01S 13/876 |
| 2020/0356668 | A1* | 11/2020 | Hart | ....................... G06F 21/554 |

FOREIGN PATENT DOCUMENTS

| WO | 2015/066578 A1 | 5/2015 |
| WO | 2019/166092 A1 | 9/2019 |

* cited by examiner

*Primary Examiner* — Walter L Lindsay, Jr.
*Assistant Examiner* — Geoffrey T Evans
(74) *Attorney, Agent, or Firm* — LEYDIG, VOIT & MAYER, LTD.

(57) ABSTRACT

A method for time alignment of sensor having a plurality of sensors for use in sensor data integration. A reference signal, with timestamp, is provided to each sensor. Output signals in response to the reference signal are identified and used to determine a time delay for response for the sensors. These time delays are stored applying time corrections to sensor data during sensor data integration used in event detection. An associated method of detecting events from sensor data from a plurality of sensors is disclosed. A threshold is determined for each of the sensors, such that a signal exceeding the threshold is identified as a potential sensor event. Potential sensor events from each sensor are detected and when potential events from at least two sensors fall within a predetermined time window this is identified to be a likely actual event.

19 Claims, 6 Drawing Sheets

Event Occurs

Figure 3a

Event Occurs

SENSOR DATA INTEGRATION AND EVENT DETECTION

FIELD OF DISCLOSURE

The present disclosure relates to integration of data obtained from a plurality of sensors and detection of events.

Background to Disclosure

Figure 1:
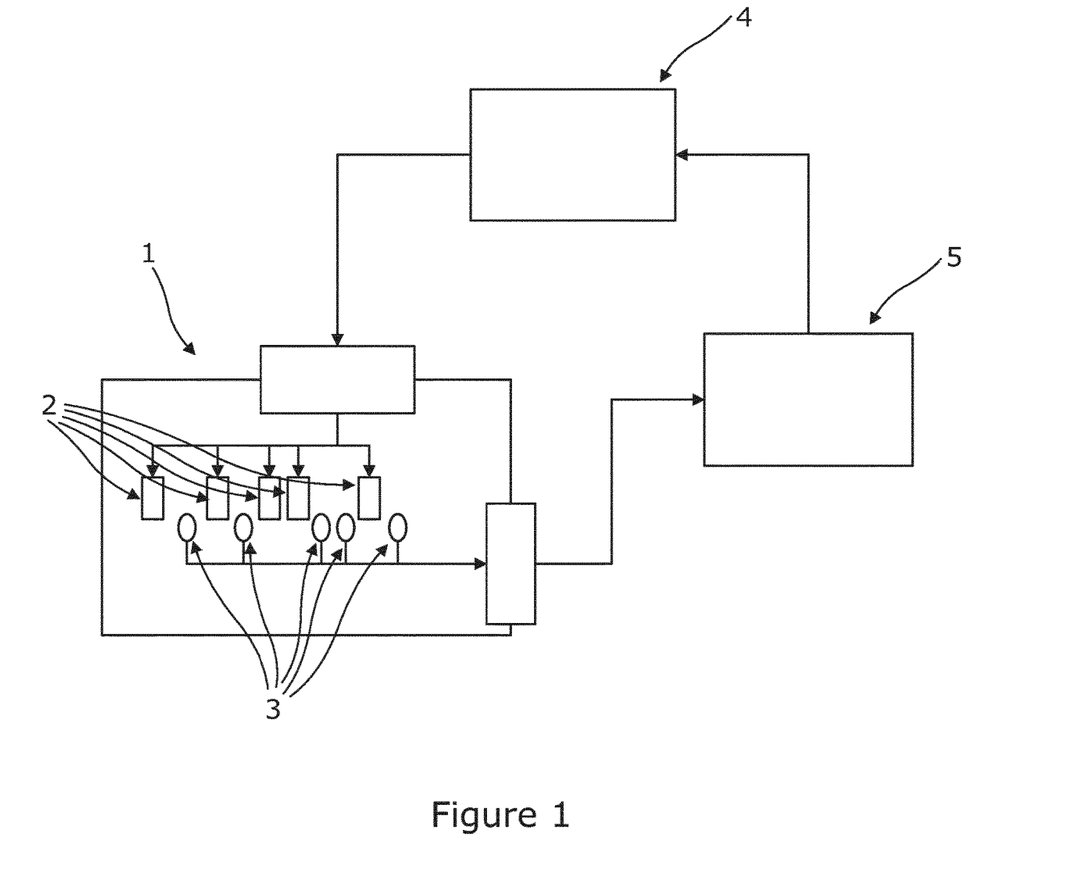
FIG. 1 shows a control system determining actions on the basis of detected events using a plurality of sensors.

Control processes respond to input variables which frequently comprise sensed values. In complex environments, there will often be a plurality of sensors of different types. As shown in FIG. 1, such a complex environment may for example be a geographical location 1 or a group of associated buildings, where a wide variety of different sensors 3 may be used to determine behaviour within the environment, for use for example in control systems for predictive power management to anticipate and respond to future demand. A control system 5 is shown remotely to the location 1, the control system using data from the sensors 3 to determine behaviour of a power supply system 4 supplying power to power consumers 2 in the location 1.

Different types of sensor will have different performance characteristics, including in particular time-related characteristics. There are two main types of such characteristics: reaction time, being the time delay between an event occurring and the sensor producing a measurement or report; and variances in responsiveness over time as components age, or are affected by the environment or by variances in manufacturing. Integration of data from different sensor types poses several challenges. In particular, when sensors are used to determine when events of interest have taken place, difference in responsiveness between sensors can significantly skew results, making correlation of sensor data to a given event less accurate, and, in extreme cases, impossible. It would be desirable to manage integration of data from a mixed assemblage of sensors more effectively, particularly, but not exclusively, in the context of event detection.

Summary of Disclosure

In a first aspect, the disclosure provides a method for time alignment of sensor data comprising: determining a plurality of sensors for use in sensor data integration; providing a reference signal with timestamp to each of the sensors in the plurality of sensors; detecting an output signal from each of the sensors in response to the reference signal, and determining a time delay for response for each of the sensors; and storing the time delay for each sensor for applying time corrections for the plurality of sensors during sensor data integration.

Using this approach, differences in response between different sensors can be eliminated by providing each sensor with a time correction factor, with these time correction factors being used to provide time alignment. Such variation in time delays may be caused by buffering and difference in processing stages within individual sensors. Eliminating these differences allows the sensor data to be integrated effectively as representative of the whole system of which the individual sensors are a part and further allows the accurate correlation of sensor signals to a specified temporal event.

In embodiments, the plurality of sensors is identified from a sensor inventory, and the time delay for each sensor may be stored by updating the sensor inventory. The time correction may also (or in other embodiments, instead) be stored in or in association with the sensor itself.

In certain embodiments, the reference signal is provided as a pulsed or periodic signal. In other embodiments, the sensors are channelized so that each sensor is identified as a separate channel. These channels may then be multiplexed within a single physical channel, so that (for example) multiple sensors may use the same channel with different time slots. This may be achieved by providing the reference signal by adding a periodic preamble for the sensor comprising a low autocorrelation code, wherein detecting of an output signal comprises performing cross-correlation to determine presence of a signal. Such channelization—using for example Gold codes or other codes with appropriate cross-correlation properties such as Kasami and Hadamard codes, as in CDMA— can be a particularly effective approach to managing data in a complex sensor assembly.

The process of detecting an output signal for a sensor may comprise identifying a protocol for reading that sensor, and performing a sensor reading operation according to that protocol. Sensors which cannot be read effectively using any protocol can then be discarded.

In a second aspect, the disclosure provides a method of detecting events from sensor data from a plurality of sensors, the method comprising: determining a threshold for each of the sensors, whereby a signal exceeding the threshold is identified as a potential sensor event; receiving the sensor data, and detecting potential sensor events from each of the sensors; identifying when potential sensor events from two or more sensors fall within a predetermined time window; performing time alignment of the sensor data for sensor data integration to determine whether the potential sensor events correspond to one or more actual events, and providing a representation of the actual event(s) from the integrated sensor data.

This act of detecting extends to inferring events based on fusion and analysis or two or more sensor outputs. For example, from positive outputs from sensors indicating high humidity and low pressure it can be inferred that it is raining.

Using this approach, sensor data can be used effectively to identify, and characterise, actual events without excessive computation when a potential event is detected. This has a number of practical benefits, including energy saving and preservation of network bandwidth.

Performing time alignment may comprise finding a preferred timing offset for each sensor. For one or more of the sensors this may involve averaging over multiple readings, for example by a windowed average over the last N readings.

Time alignment may use time delays for the plurality of sensors as established using the method of the first aspect of the disclosure. This is a particularly effective way in which to manage the integration of sensor data for an assemblage of sensors in a particular environment, such as a building or group of buildings, and to use the integrated sensor data in event detection.

In embodiments, the representation of the actual event may comprise an identification of the sensors that have detected that actual event. It may also comprise the identification of a pattern of sensors used for detection of an actual event.

In a third aspect, the disclosure comprises computing apparatus comprising a processor and a memory, wherein the processor is programmed to perform the method of either or both of the methods of the first and second aspects, and wherein the computing apparatus is connected to receive sensor data from the plurality of sensors used in the method.

Where the processor is programmed to perform the method of the second aspect, the computing apparatus may be adapted to provide the representation of the actual event to a remote computing system. This is particularly effective when the first and second aspects are carried out by the computing apparatus located in association with a specific environment, but wherein for analysis and management of the environment sensor data it needs to be provided elsewhere—for example, to a management system addressing a number of different environments.

In a fourth aspect, the disclosure provides a system for detecting events, comprising: a plurality of sensors, wherein each of the sensors has a stored time delay for response and a threshold for detection of a potential sensor event; and a programmed processor, adapted to identify potential sensor events from the plurality of sensors and to use the stored time delays for relevant sensors from the plurality of sensors to determine whether an identified potential sensor events corresponds to an actual event.

This programmed processor may be adapted to provide a representation of the event to a remote computing system. The programmed processor may be adapted to characterise a determined actual event from data received from relevant sensors of the plurality of sensors.

In a fifth aspect, the disclosure provides a control system comprising a programmed processor, wherein: the control system is adapted to receive representations of actual events obtained according to the method of the second aspect; and the programmed processor is adapted to analyse a system using the received representations of actual events, and to determine control operations or a control strategy therefrom.

Such a control system may be a power management system for an environment and the actual events may be events associated with the environment.

DESCRIPTION OF SPECIFIC EMBODIMENTS

Specific embodiments of the disclosure are now described, by way of example only, with reference to the accompanying drawings, of which.

As described above in FIG. 1, embodiments of the disclosure may relate to sensors deployed in a complex environment, such as a geographical location 1 or a group of associated buildings. In embodiments of the disclosure, a wide variety of different sensors 3 are used to determine behaviour within the environment. There are several possible purposes for this. One is in control systems for predictive power management to anticipate and respond to future demand. A control system 5 is shown remotely to the location 1, the control system using data from the sensors 3 to determine behaviour—both to detect existing behaviour, and to provide control—of a power supply system 4 supplying power to power consumers 2 in the location 1. Power supply measurement and control is not the only possible application for a system of this type.

Figure 2:
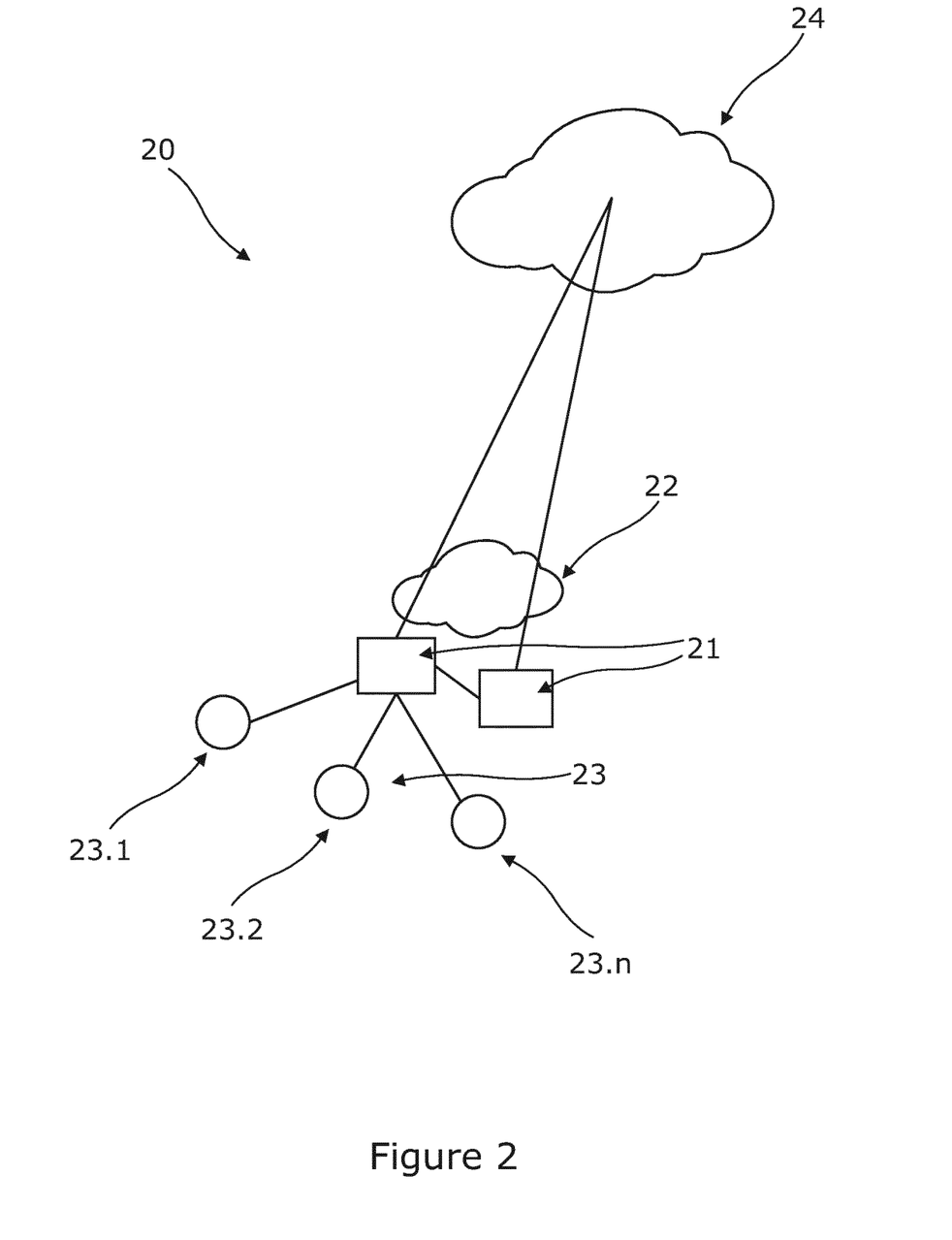
FIG. 2 shows an architecture for implementing a control system as shown in FIG. 1.

A computing architecture 20 appropriate for use in this kind of arrangement is shown in FIG. 2. Calculation of power management behaviour may require complex calculation, and it may involve information received from a number of different environments—normally this would be carried out in a distributed environment ("the cloud"), an on-premises computing environment, mobile edge computing environment, or by an appropriate remote computing environment—represented here as cloud environment 24. It will however often be desirable for significant computing—in particular, event detection, to be carried out locally so that it is not necessary to forward a full data stream from every sensor to the cloud environment 24. This may be carried out by an edge computing unit 21—in a complex environment there may be a number of such edge computing units 21 (for example, one for each building in a managed environment) and these may be linked by an on-premises data network 22. Each of the edge computing units 21 is here connected to an assemblage of sensors 23, such as sensors 23.1, 23.2 ... 23.n shown associated with edge computing unit 21.1. Here the edge computing unit 21 will have an appropriately programmed processor and access to storage, together with such network or other connectivity as is necessary to receive sensor data and to be able to communicate with the cloud environment 24.

In embodiments of the disclosure, data integration and event detection together involve two processes. One is the time alignment of data from the assemblage of sensors. The other is use of the time aligned data to detect events. Both of these events may in principle take place at more than one point in the computing architecture 20, but a particularly suitable location is the edge computing unit 21 for detection of events from the assemblage of sensors 23 associated with that edge computing unit 21.

Figure 3A:
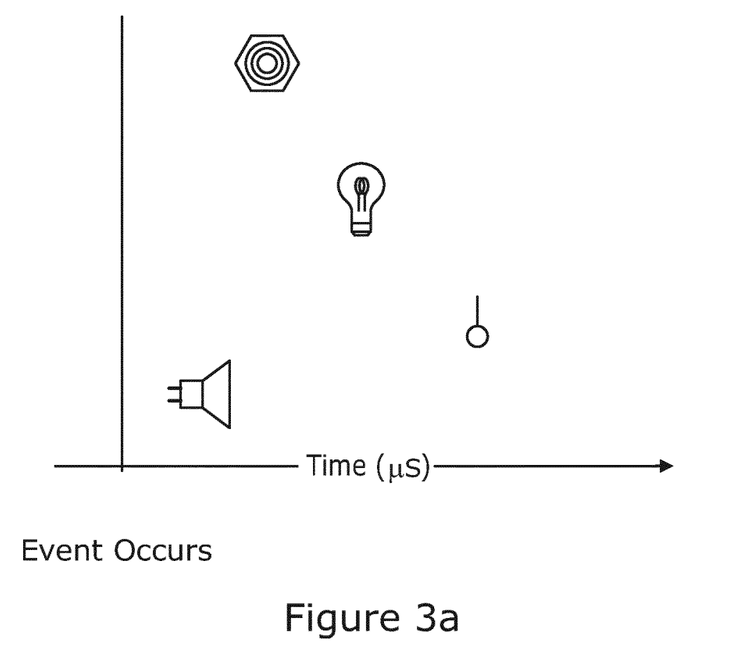
FIGS. 3a and 3b illustrate sensor readings and time aligned sensor readings respectively.
Figure 3B:
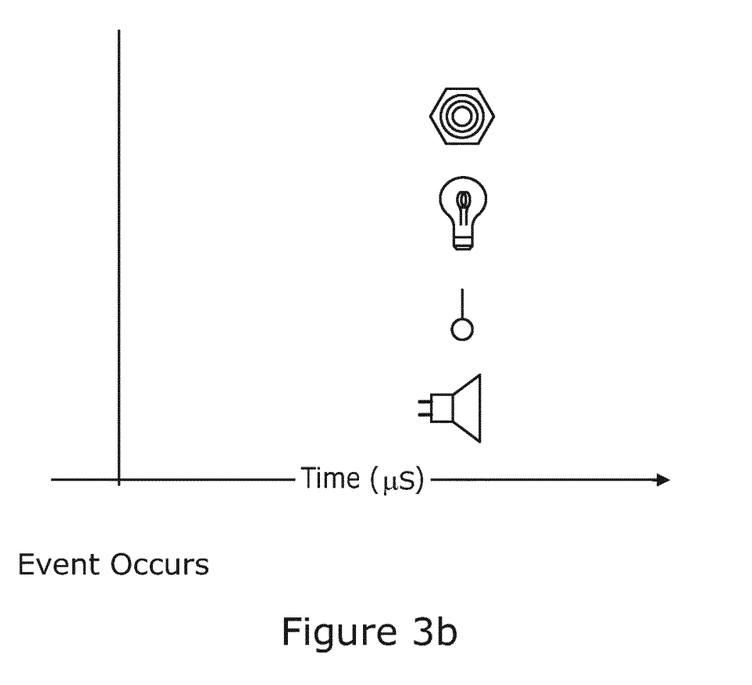

FIGS. 3a and 3b illustrate the issue in general terms. As perceived by the edge computing unit 21, signals from the sensors 23 appear to take place at different times even when they are derived from a common event. There may be a number of reasons for this—delay between the event and its detection by the sensor, responsiveness in time of the sensor itself, and time delay between the sensor and the edge computing unit are three that are likely to need consideration. It would be desirable to correct the position at the edge computing unit to that shown in FIG. 3b rather than the one shown in FIG. 3a, so that it is possible to determine when two or more sensor signals relate to the same event. It should be noted that the practical position may be slightly more complex than that shown in FIGS. 3a and 3b, in that there may be some variation in the time in which sensor readings from a common event take to reach the edge computing unit—this would mean that it will be necessary to consider a corrected sensor value as a distribution rather than a point reading when considering event detection.

Figure 4:
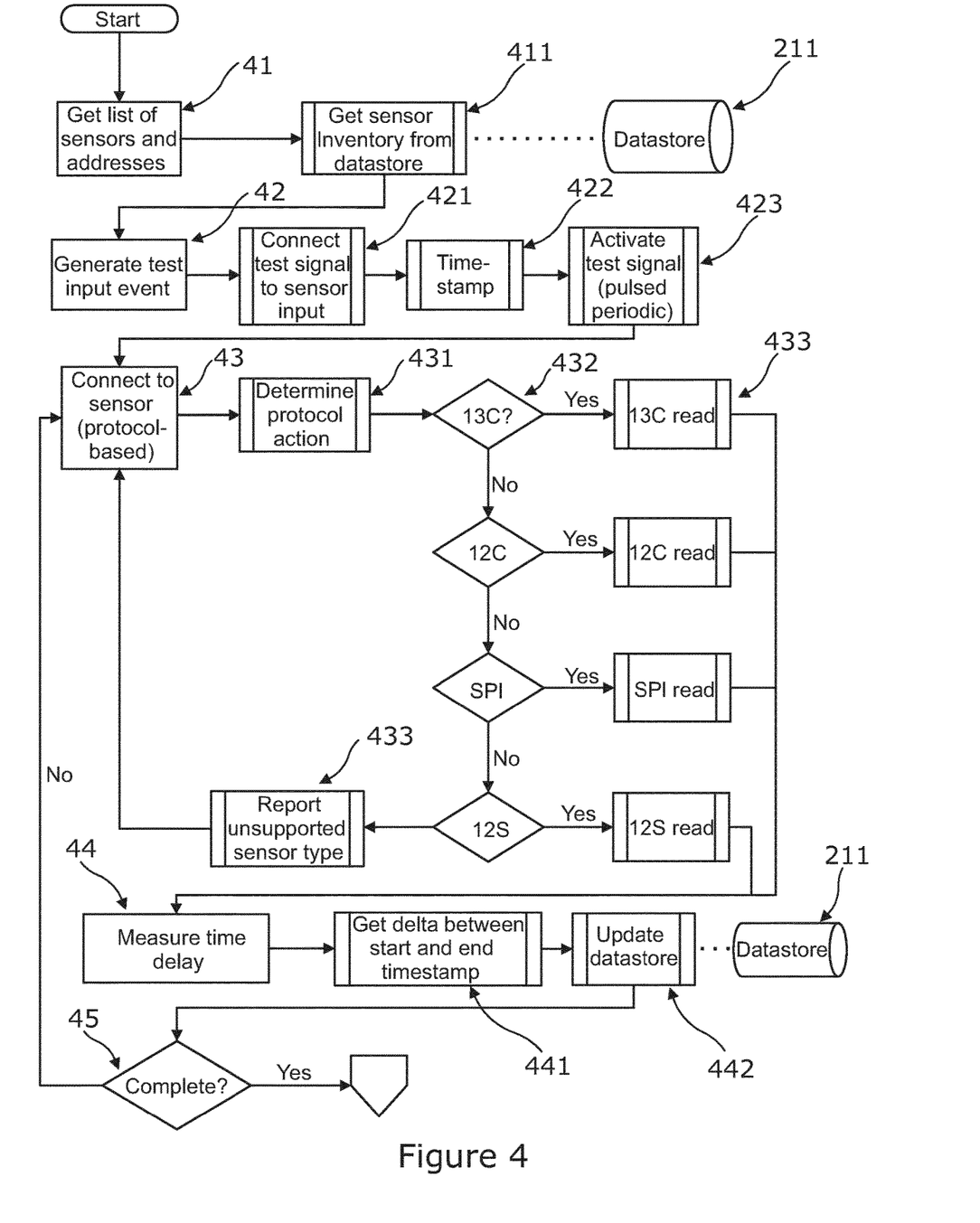
FIG. 4 illustrates a first embodiment of a method of providing time alignment for readings from an assemblage of sensors.

FIG. 4 illustrates main steps in a first embodiment of a method of time alignment of sensor readings according to the disclosure.

First of all, it is necessary to discover 41 an assemblage of sensors, typically in the form of a list of sensors with sensor identifiers (for example, addresses). These are sensors which are relevant to detection of events in that if the same event is captured at some combination of the sensors then that combination may be instrumental in characterising the event or differentiating it from other events in a way that will be used in a downstream analysis model. The sensors may, for example, relate to a common geography (for example, the sensors may form the set of sensors contained within a specific building) but this is not necessarily the case. Typically, this step may involve obtaining 411 a sensor inventory from a data store 211 associated with the edge computing unit 21, but it may in principle involve other processes such as device discovery.

After this, a test input signal is provided 42 to characterize the delay associated with a sensor. This is typically a known reference signal emitted at a known time (for example, a delta function at a defined time zero, or a pulsed periodic signal as shown in the FIG. 4 example). A signal input connection 421 is made to the sensor, a timestamp 422 applied to establish the timeframe and the test signal activated 423. This test input signal is used to activate each sensor so that the sensor will produce a characteristic output capable of being used for event detection.

After the edge computing unit 21 connects 43 to the sensor and the output sensor data read out for the reference signal sensor event. Communication of sensor data to the edge computing unit may be by one of a number of different protocols—the protocol may be one particularly appropriate to a particular sensor type, and the pathways from the sensors to the edge computing unit may also be associated with a particular protocol (for example, communications with a particular type of sensor may be over a specific bus using a particular protocol). Exemplary protocols are Serial Peripheral Interface (SPI), Inter-Integrated Circuit (I2C), and I3C as specified by the Mobile Industry Processor Interface (MIPI) alliance. In the approach shown in FIG. 4, in making the connection it is determined 431 which protocol is to be used, and the protocols are worked through 432 in a list and a reading taken 433 using the first appropriate protocol—if none of the available protocols is effective an unsupported sensor type is reported 434 and the sensor is omitted from the time alignment process.

When the edge computing unit 21 has received the sensor signal it determines 44 the time delay—this can be determined 441 from the sensor event data and the known reference signal timestamp. Either a local or a network-based time source could be used. Possibilities include network time protocol (NTP), IEEE 1588 precision time protocol (PTP) and local or satellite-based timing based on an atomic clock timing source (such as Global Positioning Service—GPS, Global Navigation Satellite System—GLONASS, Galileo, BeiDou Navigation System). When this has been determined, the datastore 211 can be updated 442 with a time delay for the sensor. Information may also be recorded in (or in a local memory associated with) the sensor itself.

This process repeats 45 until it has completed. There may be two aspects to this repetition. One is that the assemblage of sensors may be addressed either sequentially or in parallel (in that the steps indicated above may be carried out for multiple sensors in the assemblage at the same time). Whichever approach is taken, the process needs to be iterated until all the sensors in the assemblage have been assessed and a time delay provided (or the sensor rejected from the process). However, in some cases, a sensor may provide a variable delay for reasons discussed above. In such cases, it is desirable to perform multiple readings for a given sensor until a sufficient level of confidence in the sensor time delay is reached—this may involve only achieving a mean or median value to a sufficient level of confidence, or may involve recording a distribution of possible values of the sensor time delay. Again, information will be recorded in the datastore 211 for each sensor, or possibly in or with the sensors themselves.

Figure 5:
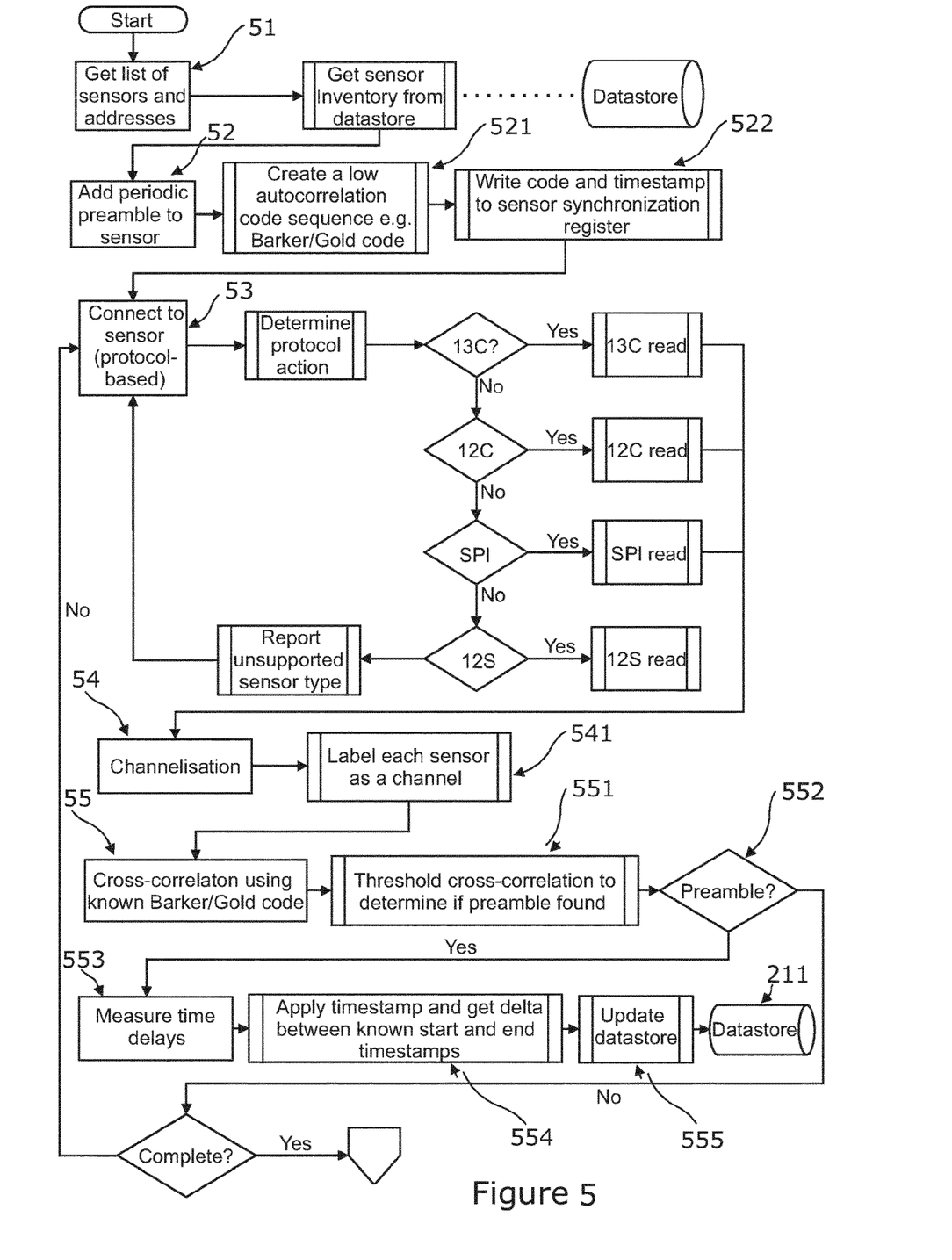
FIG. 5 illustrates a second embodiment of a method of providing time alignment for readings from an assemblage of sensors.

A modified approach to establishing sensor time delays is shown in FIG. 5. A list of sensors is established 51 as in the FIG. 4 case, but instead of simply providing a test signal with respect to a reference time as in the FIG. 4 case, a periodic known preamble sequence is added 52 to the sensor payload. This is preferably provided 521 as a code with low autocorrelation properties to allow sensor signals to be resolved effectively—Barker sequences are the most complete solution, but a practical approach is to use a Gold code (as is typically done in code-division multiple access (CDMA) channel access for telecommunications). Other codes with appropriate properties, such as zero cross-correlation codes—Kasami codes and Hadamard codes are therefore other possible candidates. The code and associated timestamp may then be written 522 to a sensor synchronization register.

Connection 53 of sensors to the edge computing unit 21 is made using an appropriate protocol as before, but the approach of FIG. 5 differs when signals are received. The sensor data is channelized 54, with each sensor labelled as a channel 541. Time division may be used for multiplexing—multiple sensors may use a single channel, each having a different time slot A cross-correlation process 55 then follows using the codes—if a cross-correlation threshold is met 551, then it is determined whether a preamble is present 552—if not the process continues, but if so, the time delays are measured 553 and the timestamp applied 554 as before to determine the time delay for a sensor after which the data store 211 is updated 555.

Figure 6:
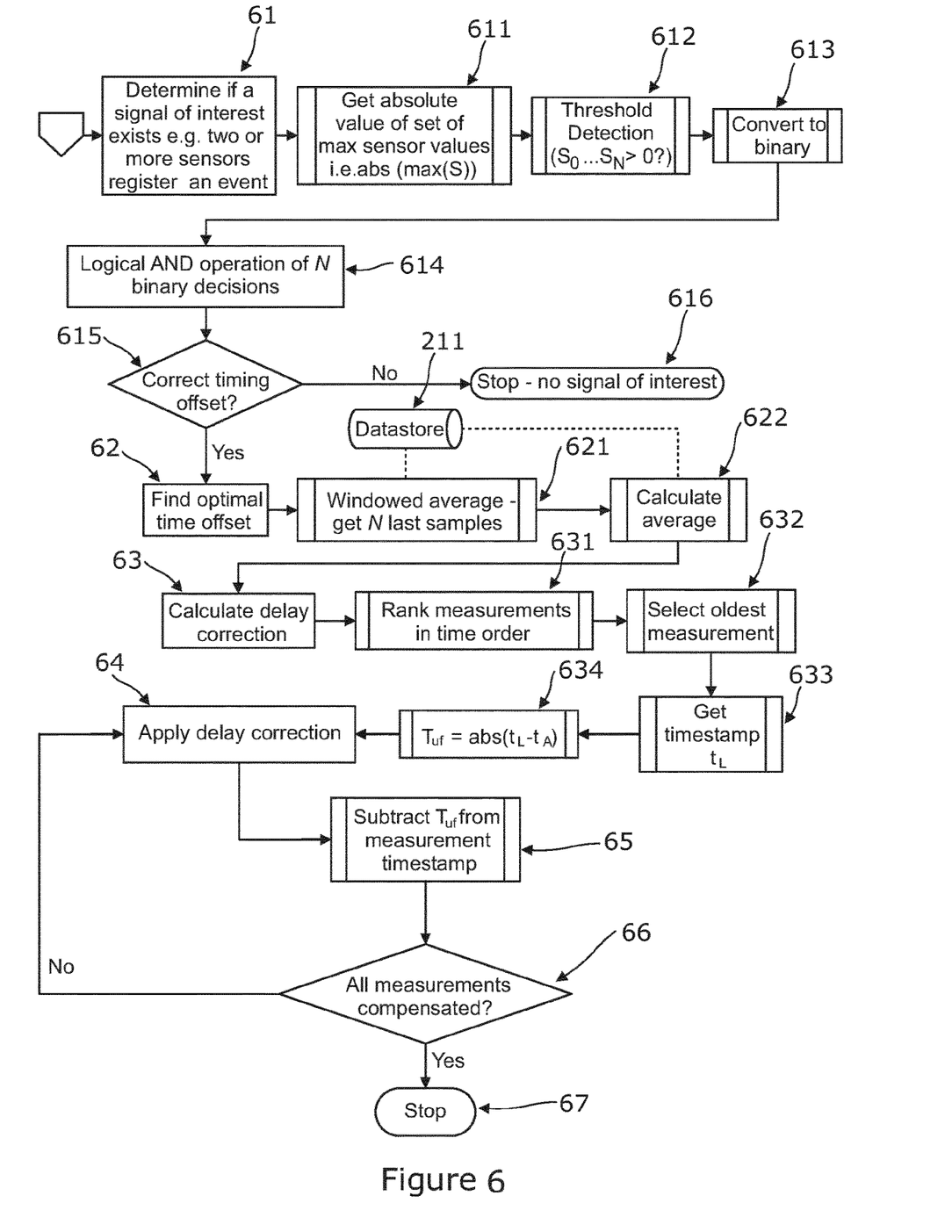
FIG. 6 illustrates an embodiment of a method of event detection following time alignment such as that provided by the methods illustrated in FIGS. 5 and 6.

Once the time delays have been established for the sensor assemblage, this is used for event detection. An embodiment of an event detection process using time aligned sensor data is shown in FIG. 6.

The first step is to determine 61 if a signal of interest exists—the criterion for this may for example be that two or more sensors register an event, but other criteria may be used in different arrangements. This is achieved by receiving a stream 611 of maximum sensor values—absolute sensor values—and then determining whether there has been a potential event for any given sensor by a threshold detection 612 step to determine whether the sensor output value meets or exceeds a predefined threshold or watermark level (which may be configurable). If the threshold is met, the sensor value is converted 613 to a simple binary value. This is followed by a logical AND operation 614 between the different sensor values to determine whether there is a potential event, in that the AND operation finds there to be an event detected by at least two sensors. The timing offset is corrected 615 for the sensors that have "detected" the potential event to determine whether the event genuinely occurs at the same point in time after time alignment—if it does not 616, the process stops here, otherwise it continues.

As can be seen, using this approach, full time alignment is not required until there is detection of an event. In principle, time alignment could be carried out for all sensors before determination whether an event has been detected. This would, however, require a great deal more computation to take place—avoiding this computation will allow effective use of computing resources with incidental benefits such as energy saving.

Once the event has been detected, however, an optimal time delay offset is found 62 for the assemblage of sensors. This optimal time delay offset is the correction value that most accurately results in the alignment of all registered sensor data measurements. This may include, for example, determining a windowed average based on a sample set of values derived from one or more reference tests—here a sliding time-windowed approach is used in which the latest N samples are used 621 and an average calculated 622 all with reference to data held in the data store 211.

The delay correction factor 63 is then calculated—this may be done by ranking 631 the sensor measurements in time order (for example, oldest first) and selecting 632 the oldest measurement as the new time alignment point for all sensor measurements. The timestamps are recovered 633 and a time offset determined 634 for each sensor, which allows delay correction 64 to take place. The time offset is subtracted 65 from the measurement timestamp, a process that continues until all sensor measurements have been compensated 66. At this point, time alignment is complete, and it can be established which sensors have detected or otherwise responded to the event and the process may stop 67.

This approach allows a determination to be made at the edge computing unit 21 that an event of interest has taken place, and which of the sensors has detected the event of interest. This may allow for characterisation of the event, and determination of what information should be provided in relation to the event from the edge computing unit to the remote computing environment performing analysis and power management. This allows for a flow of information from the edge computing unit 21 that comprises a selected set of data related to detected events rather than an undifferentiated stream of data requiring further analysis. This limits the computational burden at the remote computing system and reduces the amount of data transmitted between edge computing units and the remote computing system, increasing overall efficiency.

This act of detecting an event may extend to inferring events based on fusion and analysis or two or more sensor outputs. For example, from positive outputs from sensors indicating high humidity and low pressure it can be inferred that it is raining. In embodiments, such event characterisation may take place at the edge computing unit 21, and in others, the edge computing unit 21 may simply determine that an event needing consideration has taken place, with the remote computing environment providing the event characterisation—event characterisation may also be split between the two. It should be noted that event characterisation may not be determined only by which combination of sensors are involved, but also from the pattern of sensors used.

Using this approach, in the environment shown in FIG. 1 with the computing architecture shown in FIG. 2, events are detected by the edge computing unit 21 from the readings given by the sensors 3, 23. The stored time delays are used by the edge computing unit 21 to determine whether a potential event sensed by the sensors is an actual event, and may also provide a characterisation of the event based on what sensors or pattern of sensor responses was involved—though such a characterisation may in embodiments be left to the power management system itself, located here in the cloud environment 24, with the edge computing unit 21 simply providing enough information (such as sensor readings for a relevant time period from relevant sensors) to represent the actual event. The power management system uses the actual events and their characterisation or representation to make power management control operations, or a power management control strategy, for the environments. In other embodiments, the control system may not be a power management system, but another control system.

As the skilled person will appreciate, the embodiments described above are exemplary, and further embodiments falling within the spirit and scope of the disclosure may be developed by the skilled person working from the principles and examples set out above.

The invention claimed is:

1. A method of detecting events from sensor data from a plurality of sensors, the method comprising:
   determining a threshold for each of the sensors, whereby a signal exceeding the threshold is identified as a potential sensor event;
   receiving the sensor data, and detecting potential sensor events from each of the sensors;
   identifying when potential sensor events from two or more sensors fall within a predetermined time window;
   performing time alignment of the sensor data for sensor data integration, wherein performing the time alignment comprises finding a preferred timing offset for each sensor, and wherein, for one or more of the sensors, the preferred timing offset is averaged over multiple readings;
   based on the time-aligned sensor data, determining that the potential sensor events occur at a same point in time;
   based on determining that the potential sensor events occur at the same point in time, determine that the potential sensor events correspond to an actual event; and
   providing a representation of the actual event from the integrated sensor data.

2. The method of claim 1, wherein the preferred timing offset is a windowed average over the last N readings.

3. The method of any of claim 1, wherein time alignment comprises using time delays for the plurality of sensors established using a method having the steps of:
   determining a plurality of sensors for use in sensor data integration;
   providing a reference signal with timestamp to each of the sensors in the plurality of sensors;
   detecting an output signal from each of the sensors in response to the reference signal, and determining a time delay for response for each of the sensors; and
   storing the time delay for each sensor for applying time corrections for the plurality of sensors during sensor data integration.

4. The method of claim 1, wherein the representation of the actual event comprises an identification of the sensors that have detected that actual event.

5. A computing apparatus comprising a processor and a memory, wherein the processor is programmed to perform the method of claim 1, and wherein the computing apparatus is connected to receive sensor data from the plurality of sensors used in the method.

6. The computing apparatus of claim 5, wherein the computing apparatus is adapted to provide the representation of the actual event to a remote computing system.

7. A control system comprising a programmed processor, wherein:
   the control system is adapted to receive representations of actual events obtained according to claim 1; and
   the programmed processor is adapted to analyse a system using the received representations of actual events, and to determine control operations or a control strategy therefrom.

8. The control system of claim 7, where the control system is a power management system for an environment and the actual events are events associated with the environment.

9. The method of claim 1, wherein performing the time alignment of sensor data comprises:

ranking the sensor data in time order;
selecting a first measurement as a time alignment point for the sensor data;
recovering a time stamp for each measurement of the sensor data; and
performing a delay correction on each measurement of the sensor data based the timing offset for each sensor.

10. The method of claim 9, wherein the time order is oldest first.

11. The method of claim 10, wherein the first measurement is an oldest measurement of the sensor data.

12. The method of claim 9, wherein the delay correction on each measurement is performed by subtracting the preferred timing offset from the time stamp for each measurement of sensor data.

13. A system for detecting events, comprising:
a plurality of sensors, wherein each of the sensors has a stored time delay for response and a threshold for detection of a potential sensor event; and
a programmed processor, adapted to identify potential sensor events from the plurality of sensors and to use the stored time delays for relevant sensors from the plurality of sensors to determine whether identified potential sensor events corresponds to an actual event based on determining that the identified potential sensor events occurred at the same point in time, wherein determining that the identified potential sensor events occurred at the same point in time is based on performing time alignment of sensor data for sensor data integration, wherein performing the time alignment comprises finding a preferred timing offset for each sensor of the plurality of sensors, and wherein for one or more of the plurality of sensors the preferred timing offset is averaged over multiple readings.

14. The system of claim 13, wherein the programmed processor is adapted to provide a representation of the event to a remote computing system.

15. The system of claim 13, wherein the programmed processor is adapted to characterise a determined actual event from data received from relevant sensors of the plurality of sensors.

16. A method of detecting events from sensor data from a plurality of sensors, the method comprising:
determining a threshold for each of the sensors, whereby a signal exceeding the threshold is identified as a potential sensor event;
receiving the sensor data, and detecting potential sensor events from each of the sensors;
identifying when potential sensor events from two or more sensors fall within a predetermined time window;
performing time alignment of the sensor data for sensor data integration, wherein performing the time alignment comprises finding a preferred timing offset for each sensor;
based on the time-aligned sensor data, determining that the potential sensor events occur at a same point in time;
based on determining that the potential sensor events occur at the same point in time, determine that the potential sensor events correspond to an actual event; and
providing a representation of the actual event from the integrated sensor data,
wherein performing the time alignment of sensor data further comprises:
ranking the sensor data in time order;
selecting a first measurement as a time alignment point for the sensor data;
recovering a time stamp for each measurement of the sensor data; and
performing a delay correction on each measurement of the sensor data based the timing offset for each sensor.

17. The method of claim 16, wherein the time order is oldest first.

18. The method of claim 17, wherein the first measurement is an oldest measurement of the sensor data.

19. The method of claim 16, wherein the delay correction on each measurement is performed by subtracting the preferred timing offset from the time stamp for each measurement of sensor data.

* * * * *